UNITED STATES PATENT OFFICE.

JAMES WARREN, JR., OF NEW YORK, N. Y.

IMPROVEMENT IN PREPARING MATERIALS FOR LEMONADE.

Specification forming part of Letters Patent No. 5,292, dated September 11, 1847.

*To all whom it may concern:*

Be it known that I, JAMES WARREN, Jr., of and now residing at No. 42 Reade street, in the city of New York, in the county and State of New York, have invented a new and Improved Preparation for Lemonade; and I do hereby declare that the following is a full and exact description.

*Preparation.*—I. Procure the best and soundest fresh lemons, and let them be washed clean and dried. Then let the rind or peel be cut through to the pulp from end to end in quarter-sections or more, taking care not to cut so deep as to allow the juice to escape and then peel off the rind. The rind should then be laid away in a dry place and warm atmosphere, secluded from the sun and dust, and with frequent mixing and moving of it, so that it may not mold, allow it to become thoroughly dry. This done, grind it to a powder and sift it through a sieve of bolting-cloth, (No. 10,) and then put it into glass jars, stop them tight, and blacken or cover the outside of the jars with paper, so as to protect it from the light, when it may be set aside for use.

II. Submit the pulp of the lemon to a press and express the juice. Strain it, and then to every pint of juice add one ounce of the carbonate of lime, (prepared chalk,) or as much as may be necessary to saturate the juice, by small portions at a time while the juice is boiling, and when saturated let it subside, pour off the liquor, and the citrate of lime will form the residuum. Wash this residuum three or four times in warm water, and then dry it, after which reduce it to powder. To this powder add nine ounces of diluted sulphuric acid gradually, and then boil it for ten minutes, press it through a linen cloth, and afterward filter it through paper. Evaporate this liquor over a gentle heat until crystals are formed. These crystals are the citric acid, and should be dissolved in pure water and crystallized a second and third time, and as often filtered through paper, in order to obtain the acid perfectly pure. This done, the crystal should be reduced to a powder in an entirely dry atmosphere and bottled up for use.

III. Wash the pulp of the lemon which has been expressed with water until entirely freed from acid, and then macerate for two days in warm water and strain it off. Dry this residuum, which contains the fecal and mucilage. Grind to an impalpable powder, and bottle it for use.

*Recipe for lemon-sugar, lemonade-sugar, or sugar of lemon.*—Take of powdered white sugar (refined) one hundred pounds; powdered citric acid, as prepared above, three pounds fourteen ounces; powdered rind or peel, as prepared above, six and one-half ounces; powdered pulp or mucilage, as prepared above, six and one-half ounces, and let them be thoroughly mixed together, when it will be fit for use. One large tablespoonful of the sugar thus prepared will be sufficient for a tumbler of water which will contain acid and all the other parts of the lemon equal to the half of a medium-sized lemon.

What I claim is—

The above-described composition for making lemonade, the whole being prepared substantially as above described.

JAMES WARREN, JR.

Witnesses:
  N. C. EVERETT,
  GEORGE FOSTER.